United States Patent [19]
Fletcher et al.

[11] 3,835,318
[45] Sept. 10, 1974

[54] FAST SCAN CONTROL FOR DEFLECTION TYPE MASS SPECTROMETERS

[76] Inventors: James C. Fletcher, Administrator of the National Aeronautics and Space Administration with respect to an invention by; Paul R. Yeager, Box 901; Gianni Gaetano, Railway Rd., both of Grafton, Va. 23490; David B. Hughes, 34 Langhorne Circle, Newport News, Va. 23606

[22] Filed: May 4, 1973

[21] Appl. No.: 357,126

Related U.S. Application Data

[63] Continuation of Ser. No. 188,836, Oct. 31, 1971, abandoned.

[52] U.S. Cl. ............................... 250/281, 250/295
[51] Int. Cl. ........................................... H01j 39/34
[58] Field of Search.................... 250/281, 282, 295

[56] References Cited
UNITED STATES PATENTS
3,601,607  8/1971  Wassenburg............................. 250/

OTHER PUBLICATIONS

"Semiautomatic Data Collection System for Mass Spectrometers," Moreland, Review of Sci. Inst. Vol. 38, no. 6, 6/67.

Primary Examiner—James W. Lawrence
Assistant Examiner—C. E. Church
Attorney, Agent, or Firm—Howard S. Osborn; William H. King; John R. Manning

[57] ABSTRACT

A high-speed scan device that allows most any scanning sector mass spectrometer to measure preselected gases at a very high sampling rate. The device generates a rapidly changing staircase output which is applied to the accelerator of the spectrometer and it also generates defocusing pulses that are applied to one of the deflecting plates of the spectrometer which when shorted to ground deflects the ion beam away from the collector. A defocusing pulse occurs each time there is a change in the staircase output.

6 Claims, 4 Drawing Figures

INVENTORS
PAUL R. YEAGER
GIANNI GAETANO
DAVID B. HUGHES
BY
ATTORNEYS

FAST SCAN CONTROL FOR DEFLECTION TYPE MASS SPECTROMETERS

This is a continuation of application Ser. No. 188,863 filed Oct. 31, 1971, now abandoned.

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

The invention relates generally to mass spectrometers and more specifically concerns a device for providing fast scans of mass spectrometers.

In order to record mass spectra by electronic means in deflection type mass spectrometers, it is necessary to cover the mass range by either changing the ion acceleration voltage, changing the magnetic field, or providing separate ion collectors for each species, specific values of voltages for specific magnetic field strengths may be used, or a special instrument may be built with separate collectors for those species desired. To adapt or use a generally available scanning instrument, either electrical or magnetic switching must be utilized. Most applications immediately rule out the use of magnetic field switching as being too slow and too expensive. Therefore, all past designs to use scanning instruments for discrete species have utilized stepped acceleration voltages to accomplish the stepped scan. Past systems have used electromechanical means of voltage switching at rates of several seconds per step which, while effective, is too slow for many applications.

It is therefore the primary purpose of this invention to provide a fast step scan for mass spectrometers.

SUMMARY OF THE INVENTION

Figure 1:
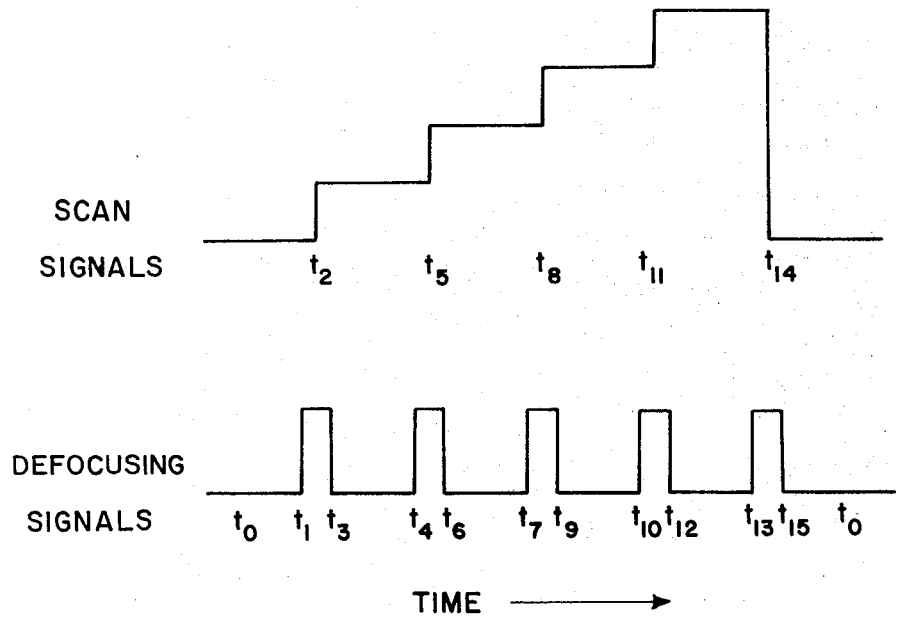
FIG. 1 is a timing diagram of the signals generated by the invention and applied to a mass spectrometer.

The invention is an entirely electronic switching system which operates rapidly enough to permit dwell times of as little as 1 millisecond per mass peak. The device as constructed switches four gases, but the design allows for the addition of more channels at any time by simply adding duplicates of existing portions of the control circuit. The timing diagram in FIG. 1 shows the signals that are generated by the switching circuit of this invention and applied to a mass spectrometer. The staircase scan signals are applied to the accelerator of the spectrometer and the defocusing signals are applied to any one of the deflecting plates of the mass spectrometer which when shorted to ground deflects the ion beam away from the collector. The operating sequence of the signals applied to the spectrometer are as follows. At the beginning of the cycle $t_0$ there is no voltage applied to the mass spectrometer accelerator. At time $t_1$ a defocusing signal is applied to the ion beam to prevent a buildup of mass signal due to the rising acceleration voltage which tends to pull in all masses which register at voltages below the selected value. At time $t_2$ the acceleration for the first gas is applied. Several microseconds later at time $t_3$ after the voltage has reached full value the defocusing voltage is turned off, and the desired mass is allowed to pass through the mass spectrometer to be recorded until time $t_4$ at which point a defocusing signal is applied to the ion beam to prevent a buildup of mass signal. At time $t_5$ the acceleration for the second gas is applied. Several microseconds later at time $t_6$ after the voltage has reached full value, the defocusing voltage is turned off and the desired mass is allowed to pass through the mass spectrometer to be recorded until time $t_7$ when another defocusing signal is applied. This procedure is continued to time $t_{15}$ which completes a cycle of the four gases. The switching circuit is then recycled to $t_0$. The purpose of the defocusing signals is to eliminate false signals caused by voltage rises.

Three modes of operation are provided. First, there is provided an automatic mode of operation in which the system continues to recycle through events $t_0$ to $t_{15}$ until stopped manually. No matter at which point in the cycle the system is stopped, it will scan to automatic reset to $t_0$ for the next operation. Second, there is provided a single scan mode of operation in which the system cycles once from $t_0$ to $t_{15}$, then stops. And third, there is provided a manual mode of operation in which the system advances one mass for each operation of a start button. Returning the mode selector to single scan will reset the system to $t_0$.

The durations of the defocusing signals are fixed to a value slightly larger than the rise time of the power supply used. The durations of the scan signal are continuously variable to permit control of the dwell times on each peak allowing control of the duration of a complete cycle. Durations of the scan signals can be set as low as about 1 millisecond which gives a total cycle duration of under 5 milliseconds. Maximum duration for each peak in the complete cycle is several seconds.

DETAILED DESCRIPTION OF THE INVENTION

Figure 2:
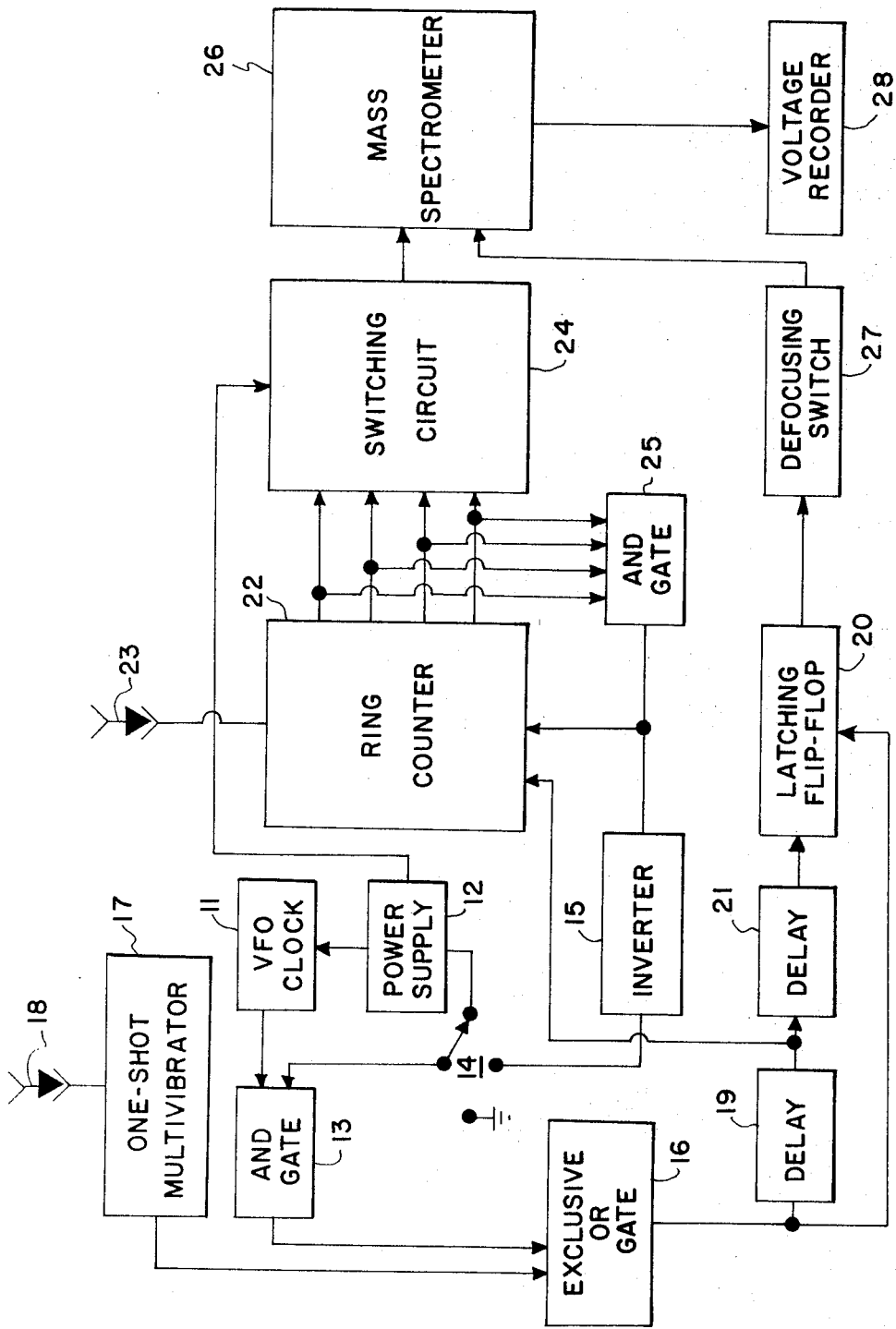
FIG. 2 is a block diagram of an embodiment of this invention.

Turning now to the embodiment of the invention selected for illustration in the drawings, the number 11 in FIG. 2 designates a variable frequency oscillator (VFO) clock. This VFO clock is an ordinary oscillator using a unijunction transistor. By selecting different values of capacitors by a five-position switch (not shown in the drawing), five frequency ranges can be chosen, and by a ten turn potentiometer (not shown in the drawing) it is possible to fine control the frequency within each band with a slight overlap between bands. The details of the VFO clock 11 are not shown in the drawing since VFO clocks are well known and the details of the VFO clock used are not considered part of this invention. Each clock pulse causes a change in the scan signals and causes a defocusing signal to be generated; hence, the frequency of VFO clock 11 determines the dwell times of the scan signals and also the frequency of the defocusing signals. The output of VFO clock 11, which is powered by a power supply 12, is applied to an AND gate 13. A three-position switch 14 is also connected to AND gate 13. In the shown position of switch 14, power supply 12 is connected to AND gate 13, in the left position of switch 14, ground is connected to AND gate 13 and in the central position of switch 14, the output from an inverter 15 is connected to AND gate 13. The output of AND gate 13 is applied to an input of an exclusive OR gate 16. The other input of gate 16 is supplied from a one-shot multivibrator 17 having a manual control 18. The output of exclusive OR gate 16 is applied to a delay 19 and to a latching flip-flop 20. The output of delay 19, which can be a one-shot multivibrator, is applied to an identical delay 21 and to a ring counter 22 having a manual reset 23. The pulses applied to the ring counter 22 cause logical O's to be produced on successive outputs of the ring counter. These outputs are all connected to a switching circuit 24 and to an AND gate 25. When all of the inputs to AND gate 25 are a logical 1, then the output of AND gate 25 is a logical 1 which is applied back to the ring counter to set it to its initial position. This logical 1 is also connected to inverter 15. The logical 0 signals applied to the switching circuit 24 causes it to apply high voltages to the accelerator of mass spectrometer 26. The voltages as applied to the mass spectrometer 26 from switching circuit 24 are the scan signals shown in FIG. 1.

As is obvious in the drawing, the output of latching flip-flop 20 caused by each clock pulse is a pulse having a duration equal to the sum of the delays caused by delay 19 and delay 21. These pulses are applied to a defocusing switch 27 which applies a high voltage to one of the deflecting plates of mass spectrometer 26. The output of focusing switch 27 is the defocusing signals shown in FIG. 1. The output of mass spectrometer 26 is recorded by a voltage recorder 28. All of the elements disclosed in FIG. 2 are well known and are not disclosed in the drawings except switching circuit 24 which is disclosed in detail in FIG. 3 and defocusing switch 27 which is disclosed in detail in FIG. 4.

Figure 3:
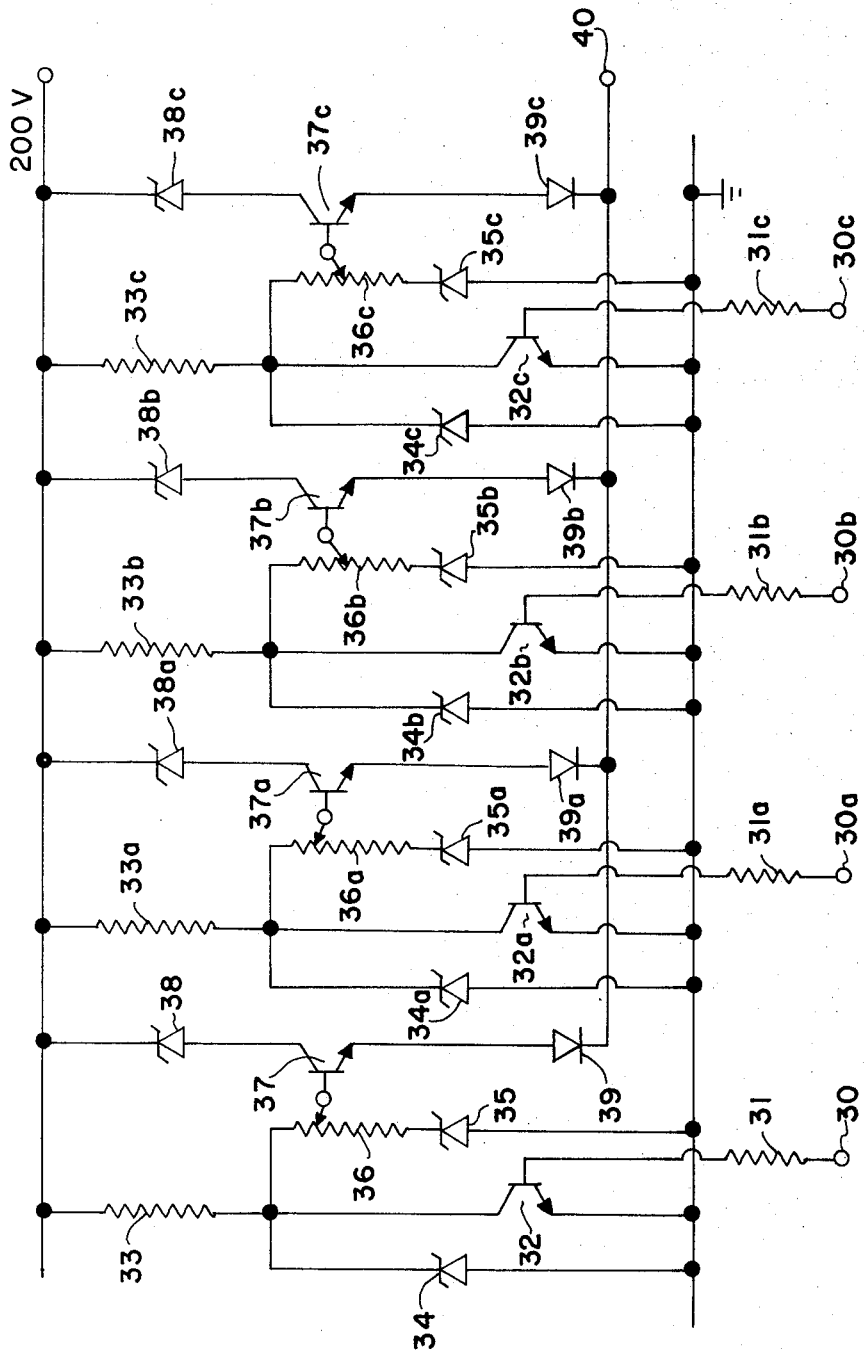
FIG. 3 is a schematic drawing of the switching circuit shown in FIG. 2.

The switching circuit 24 as shown in FIG. 3 includes a terminal 30 which is connected through a resistor 31 to the base of a transistor 32. Transistor 32 is connected in series with a resistor 33 between a 200-volt voltage power source and ground. The junction of transistor 32 and resistor 33 is connected through a zener diode 34 to ground and through a potentiometer 36 and a zener diode 35 connected in series to ground. The slider of potentiometer 36 is connected to the base of a transistor 37. The collector of transistor 37 is connected through a zener diode 38 to the 200-volt power supply and the emitter of transistor 37 is connected through a diode 39 to an output terminal 40. The foregoing circuitry is one of four circuits that make up switching circuit 24. The other three circuits are identical to this first circuit except some of the components of the different circuits have different rated values. The breakdown voltages of zener diodes 34 and 35 are 80 volts and 70 volts, respectively. Hence, when transistor 32 is not conducting there is a potential difference across potentiometer 36 of 10 volts. Consequently, values between 70 and 80 volts can be selected from the slider of potentiometer 36 and applied to the base of transistor 37. Zener diodes 34a and 35a have breakdown voltages of 110 and 100 volts, respectively. Therefore, the voltage applied to the base of transistor 37a while transistor 32a is not conducting is some preselected value between 100 and 110 volts. The breakdown voltages of zener diodes 34b and 35b are 135 volts and 125 volts, respectively, and the breakdown voltages of zener diodes 34c and 35c are 180 volts and 190 volts, respectively, Zener diodes 38, 38a, 38b and 38c have breakdown voltages of 120, 90, 65, and 20, respectively. The breakdown voltages for the zener diodes recited can be different from those given without departing from this invention. However, these values have been used in a workable device. In the operation of switching circuit 24, when ring counter 22 is in its initial position, logical 1's are applied to all four of the inputs of the switching circuit. This means that the voltages applied to the terminals 30, 30a and 30b and 30c are positive voltages which causes transistors 32, 32a, and 32b and 32c to be conductive. This results in the junctions of these transistors and resistors 33, 33a, 33b and 33c being at ground potential. When the upper output of ring counter 22 goes from a logical 1 to a logical 0, a negative voltage is applied to terminal 30 which causes transistor 32 to become nonconductive. This results in a positive potential being applied to the base of transistor 37 causing it to conduct and thereby applying approximately 80 volts to output terminal 40. Then when the second output from ring counter 22 goes from logical 1 to a logical 0, transistor 32a becomes nonconductive which results in transistor 37a becoming conductive thereby applying a voltage of approximately 110 volts to output terminal 40. When the third output of ring counter 22 goes from a logical 1 to a logical 0, a voltage of approximately 125 volts is applied to output terminal 40 and when the fourth output of ring counter 24 goes from a logical 1 to a logical 0, approximately 180 volts are applied to output terminal 40.

Figure 4:
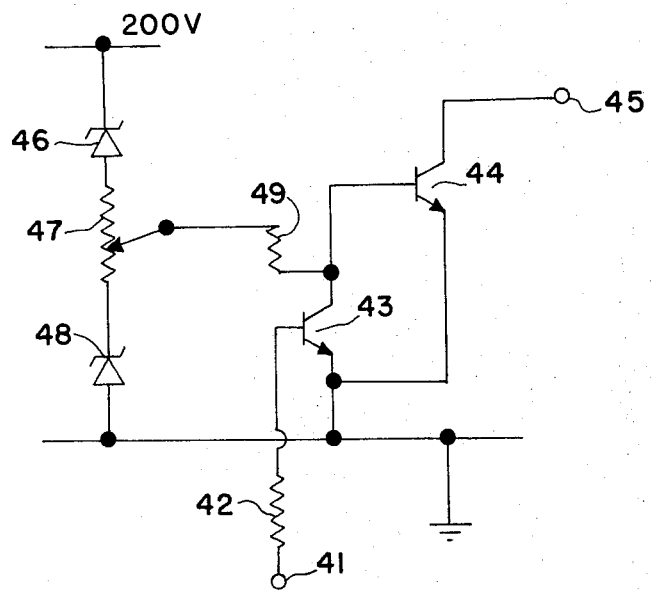
FIG. 4 is a schematic drawing of the defocusing switch shown in FIG. 2.

The defocusing switch 28, as shown in FIG. 4, includes an input terminal 41 which is connected through a resistor 42 to the base of a transistor 43. Transistor 43 is connected between the base of a transistor 44 and ground. Transistor 44 is connected between ground and an output terminal 45. A zener diode 46, a potentiometer 47 and a zener diode 48 are connected in series between the 200-volt power supply and ground. The slider of potentiometer 47 is connected through a resistor 49 to the base of transistor 44.

In the operation of the defocusing switch, with no pulse applied to terminal 41, transistor 43 is conductive which applies ground potential to the base of transistor 44. This makes transistor 44 nonconductive. When a pulse is applied to terminal 41, transistor 43 becomes nonconductive and the voltage at the slider of potentiometer 47 is applied to the base of transistor 44. This renders transistor 44 conductive thereby clamping to ground the focusing anode's voltage.

In the automatic mode of operation of the embodiment of the invention in FIG. 3, switch 14 is placed in the position shown. Then each of the clock pulses generated by VFO clock 11 is applied through AND gate 13 and through exclusive OR gate 16 to delay 19 and to latching flip-flop 20. The pulses passed through delays 19 and 21 are applied to flip-flop 20. Hence, the output of flip-flop 20 is a series of pulses having durations equal to the sum of the delays of delay 19 and delay 21. These pulses are applied to defocusing switch 27 which in turn pulses to ground the high voltage present on one of the deflecting plates of mass spectrometer 26. The pulses passed through delay 19 are also applied to ring counter 22 to shift its outputs. The resulting outputs of ring counter 22 are applied to switching circuit 24 which produces a high voltage step signal that is applied to the accelerator of mass spectrometer 26. The logical 0's generated at the output of ring counter 22 are also applied to AND gate 25 which produces a logical 1 at its output when ring counter 22 goes through a complete cycle. This logical 1 applied to ring counter 22 sets the counter to its initial position to begin another cycle. In this mode of operation ring counter 22 continues to recycle until switch 14 is manually placed in its center position.

In the manual mode of operation of the embodiment of the invention in FIG. 2, switch 14 is placed in its left position thus blocking the pulses generated by the VFO clock 11. Then one-shot multivibrator 17 is manually operated by control 18 to generate a pulse. This pulse is applied through exclusive OR gate 16 to delay 19 and to latching flip-flop 20. All of the circuitry responds to this pulse the same way that it responds to each of the pulses in the automatic mode of operation. That is, in response to the pulse a defocusing pulse is generated by defocusing switch 27 and the output of switching circuit 24 changes to a different level. Then the outputs of switching circuit 24 and defocusing switch 27 do not change until another pulse is generated by the one-shot multivibrator 17.

In the single scan mode of operation, switch 14 is placed in its center position, and by manually depressing switch 18 a single scan is initiated. Then the system responds to the VFO clock pulses in the same manner that it does when it is in its automatic mode of operation, except when AND gate 25 produces a logical 1 subsequently converted to logical 0 by inverter 15 which is applied to AND gate 13 to block the clock pulses.

The advantages of the invention lie in the high speed scan which allows most any scanning sector mass spectrometer to measure preselected gases at a very high sampling rate. Original use was breath-by-breath analysis of individuals undergoing stress. However, use could be made in any instance, where high-speed scanning of preselected gases is desirable.

It is to be understood that the form of the invention herewith shown and described is to be taken as a preferred embodiment. Various changes may be made without departing from the spirit and scope of the invention as defined in the subjoined claims. For example, logic circuits other than these shown could be used to accomplish the same purpose without departing from the invention.

What is claimed is:

1. Scan control means for controlling the mass selection of a scanning mass spectrometer, said spectrometer including an ion source with an ion accelerator, a mass selective electrostatic deflector, an ion collector and a recorder for recording the output of the mass spectrometer comprising:

a first delay means;
a second delay means having its input connected to the output of said first delay means;
a ring counter means having its input connected to the output of said first delay means for producing a plurality of parallel outputs that change each time a pulse is applied to its input;
switching circuit means connected to receive said plurality of outputs for applying to the accelerator of said mass spectrometer a different level scan signal, with each level corresponding to a separate mass peak, each time said plurality of parallel outputs change;
means connected to the input of said first delay means and to the output of said second delay means for producing an electrical signal each time a pulse is applied to said first delay means having a duration beginning at the time the pulse is applied to the input of said first delay means and ending when the pulse arrives at the output of said second delay means;
means, connected to the output of said means for producing an electrical signal for defocussing the electrostatic deflector said mass spectrometer during the durations of each of said electrical signals;

gating means connected to receive said plurality of outputs from said ring counter means for resetting the ring counter means each time the ring counter means produces a cycle of signal changes on its outputs; and
a variable frequency oscillator clock connected to supply pulses to the input of said first delay means.

2. A scan control according to claim 1 wherein said means for producing an electrical signal is a latching flip-flop.

3. A scan control according to claim 1 including a second gating means connected between said variable frequency oscillator clock and the inputs of said first delay and said latching flip-flop; and a switch means for selectively blocking said second gating means after a complete cycle of said ring counter means or maintaining said second gating means open through several cycles of said ring counter means whereby automatic and single-scan modes of operation are provided.

4. A scan control according to claim 3 including manual means for applying pulses to said first delay and said latching flip-flop whereby a manual mode of operation is provided.

5. A scan control according to claim 1 wherein said switching circuit means includes a plurality of switching circuits with each switching circuit including a first zener diode, a transistor and a diode connected in a series between a voltage source and the accelerator of said mass spectrometer, a potentiometer having its slider connected to the base of said transistor, and means, connected to receive one of said parallel outputs from said ring counter means, for producing across said potentiometer a predetermined voltage when said one of said parallel outputs changes.

6. A scan control means according to claim 5 wherein said means for producing across said potentiometer a predetermined voltage includes a second transistor and a resistor connected in series between ground and said voltage source with said one of said parallel outputs connected to the base of said second transistor, a second zener diode connected in parallel with said second transistor, and said potentiometer connected in series with a third zener diode across said second transistor.

* * * * *